United States Patent Office 2,942,950
Patented June 28, 1960

2,942,950
PROCESS FOR THE PRODUCTION OF SILICON TETRACHLORIDE

Thomas Knott Pallister, Newport, England, assignor to Monsanto Chemical Limited, London, England, a British company No Drawing. Filed Dec. 6, 1957, Ser. No. 700,957

Claims priority, application Great Britain Dec. 28, 1956

6 Claims. (Cl. 23—205)

Silicon tetrachloride has hitherto been produced mainly by passing chlorine gas through a tubular converter containing hot silicon metal in lump form; the silicon tetrachloride produced by the reaction is cooled to precipitate ferric chloride arising from iron impurities in the silicon used, and then is itself condensed by further cooling. The reaction is exothermic and because the heat produced is not dissipated rapidly enough, the lumps of silicon tend to fuse together, and calcium chloride formed from impurities in the metal also tends to form a molten slag. This is a disadvantage, for the fusion gives irregular masses tending to channel the flow of chlorine, giving uneven reaction across the convertor and ultimately inefficient reaction of the chlorine and loss of chlorine saturated with silicon tetrachloride unless additional equipment is installed to recover and separate them. As a result, a periodic shut-down of the plant is necessary to enable the agglomerated masses of silicon to be broken up. These shut-downs interrupt production, cause loss of silicon by oxidation with air which gets into the convertor, and provide extremely unpleasant working conditions, for silicon tetrachloride is an obnoxious material and is highly volatile.

In order to avoid these difficulties attempts have been made to use a fluidized bed technique in which finely-divided silicon metal is maintained in a fluidized state by the flow of chlorine through it, but the adoption of a simple fluidized bed technique has proved unsuccessful as the reaction proceeds so rapidly that it tends to get out of control. After further research it has now been discovered that if a finely-divided solid inert diluent is added to the silicon the reaction with chlorine using a fluidized bed technique proceeds smoothly, that the violent movement of the particles in the bed results in efficient transfer of heat to the walls of the convertor, and as a result fusion and agglomeration of the silicon metal particles is avoided, and the process is readily controlled. It may also be that the diluent particles, by physically insulating the silicon metal particles from one another, reduce their tendency to agglomerate, and that the diluent particles exercise an abrasive action on any agglomerated particles of silicon metal which are formed, and thus break them down.

The process of the present invention is therefore one for the production of silicon tetrachloride in which chlorine is passed through a fluidized bed of hot finely-divided silicon mixed with a finely-divided solid inert diluent.

Silicon metal of commercial quality, containing 96–99% silicon, is conveniently used, but less pure metal, for example ferrosilicons of high silicon content, can be employed. The solid inert diluent to be used should be a material substantially inert to the action of chlorine at the temperatures of the reaction (e.g., between about 450° C. and about 1200° C.) and should also remain solid at these temperatures. Suitable solid inert diluents are carbon, alumina and refractory silica (of sufficiently high melting point). A suitable form of silica is crystobalite; quartz sand can be used. Carbon is especially suitable because it is highly refractory.

The particle size of the silicon and solid inert diluent used should be such that the particles are easily kept in suspension by the gas flow but are not so fine that excessive amounts of them are carried away in the stream of gaseous products. Both the silicon metal and the solid inert diluent are conveniently of particle size such that they pass through a British Standard sieve of 10 mesh per inch and preferably the particles are of a wide range of sizes, e.g., as much as 95% +40 mesh while still having as much as 5% —200 mesh.

The proportions of solid inert diluent to silicon metal can be chosen from within wide limits and since once the reaction is started, it can be carried out continuously with the through-put controlled by addition of silicon and adjustment of the rate of flow of chlorine, the proportions can be adjusted until the most satisfactory operating conditions are attained for any given materials or through-put. Should the proportion of silicon to diluent be too high, fusion of silicon may occur, and if it is too low the reaction may be extinguished, and adjustment is made accordingly. Proportions of from 1:3 to 5:1 of silicon metal to solid inert diluent by weight are generally suitable, and a 1:1 proportion can be very satisfactory.

The convertor used in the process will be one suitable for the formation of a fluidized bed and fitted with means for feeding in silicon to maintain the bed and for introducing chlorine to react with the silicon and to keep the bed in a fluidized state. A vertical tubular convertor or an inverted conical convertor of mild steel or cast iron into which chlorine is fed at its base can be used. The walls of the convertor can be cooled by suitable means, for example, a water jacket. The exit from the convertor is of course at a point distant from the place where the chlorine enters, and is connected to a condenser leading to a suitable receiver for the silicon tetrachloride product. An intermediate condenser for removing ferric chloride impurities can be used if desired.

The invention is illustrated by the following examples.

*Example 1*

The convertor used in this example consisted essentially of a vertical tube of 2 inch diameter and length 3½ feet with a conical base narrowing to a tube of ⅜ inch diameter for entry of chlorine. The top of the tube expanded in a cone to a diameter of 12 inches, thus providing a space for limiting the fluidized bed to the tube below. The convertor was surrounded by a water jacket, and provided with a gas tight feeder for charging silicon from above and an exit from the top of the upper cone leading to a water-cooled condenser of 2 inch diameter and length 6 feet feeding a receiver by gravity.

The convertor was heated by passing boiling water through the jacket. Silicon (1.65 lb., of 96–98% purity) and washed quartz sand (0.53 lb.), these materials being capable of passing through a B.S. sieve of 10 mesh per inch, were then heated together in a crucible to 800° C. and poured into the convertor. Chlorine gas was simultaneously injected at the base of the convertor and its amount rapidly increased until a stabilized fluidized bed of depth between 9 inches and 24 inches (as indicated by measurement of the pressure drop across the bed using a suitably located manometer) was attained at a chlorine flow rate of 7 lb. per hour. Reaction of the silicon commenced immediately and fresh silicon was charged continuously at the rate of 1.4 lb. per hour to replace that used up by reaction. Silicon tetrachloride was steadily produced at a rate of 8 lb. per hour, and over a period of 5 hours a total of 41 lb. of silicon tetrachloride was collected. A chlorine utilization efficiency of about 96% was attained.

*Example 2*

This example describes the continuous chlorination of silicon in a fluid bed containing finely-divided carbon.

The convertor employed was similar in design to that of Example 1, but had the following dimensions: the vertical tube was of 6 inch diameter and length 6 feet with the conical base narrowing to a tube of 1½ inch diameter for entry of chlorine. The entry tube of 1½ inch diameter contained in a central position a carbon rod 1¼ inch diameter, so that the chlorine entered through an annular ring between the carbon rod and the tube and its velocity was thus increased. The top of the main 6 inch diameter tube expanded in a cone to a diameter of 3 feet. The convertor was surrounded by a water jacket, and provided with a gas-tight feeder for charging silicon from above and an exit from the top of the upper cone leading to a water-cooled condenser feeding a receiver by gravity.

The converter was heated by passing boiling water through the jacket. A mixture consisting of 2 lb. of silicon (96–98% purity) and 1 lb. of carbon, both these materials being finely-divided and capable of passing through a British Standard sieve of 16 mesh per inch, was then heated in a crucible to 800° C. and poured into the convertor. Chlorine gas was simultaneously injected at the base of the convertor and reaction of the silicon commenced immediately. 36 lb. of a mixture of 24 lb. of the same silicon particles and 12 lb. of the same carbon particles were gradually added, with the necessary increase in flow of chlorine to obtain a stabilized fluidized bed of depth 4 feet 9 inches (measured as indicated in Example 1); the chlorine flow rate was 186 lb. per hour. Fresh silicon was then charged continuously at the rate of 36.6 lb. per hour to replace that used up by the reaction. Silicon tetrachloride was steadily produced at a rate of 216 lb. per hour; a chlorine utilization efficiency of about 97% was attained.

What I claim is:

1. The method for producing silicon tetrachloride comprising fluidizing in an upwardly flowing gaseous stream consisting essentially of chlorine and the reaction products of such chlorine with silicon, a bed of solid finely-divided silicon mixed with a solid finely-divided inert diluent while maintaining said bed at an elevated temperature sufficiently high to cause reaction between said silicon and said chlorine to form said silicon tetrachloride.

2. The process of claim 1 in which the solid inert diluent is carbon.

3. The process of claim 1 in which the solid inert diluent is alumina.

4. The process of claim 1 in which the solid inert diluent is refractory silica.

5. The process of claim 1 in which the finely-divided fluidized solids have particle sizes such that they will pass through a sieve of 10 mesh per inch.

6. The process of claim 1 in which the weight ratio of silicon to solid inert diluent is between about 1:1 and about 5:1.

References Cited in the file of this patent
UNITED STATES PATENTS 2,425,504     Belchetz _____ Aug. 12, 1947